US007613181B2

(12) United States Patent
Lecomte et al.

(10) Patent No.: US 7,613,181 B2

(45) Date of Patent: Nov. 3, 2009

(54) PROCESS AND DEVICE FOR SECURING THE TRANSMISSION, RECORDING AND VIEWING OF DIGITAL, AUDIOVISUAL PACKETIZED STREAMS

(76) Inventors: Daniel Lecomte, 157, rue de la Pompe, F-75116 Paris (FR); Mohammed Lamtouni, 35, avenue Simon Bolivar, F-75019 Paris (FR)

( * ) Notice: Subject to any disclaimer, the term of this patent is extended or adjusted under 35 U.S.C. 154(b) by 565 days.

(21) Appl. No.: 11/264,953

(22) Filed: Nov. 2, 2005

(65) Prior Publication Data

US 2006/0072559 A1 Apr. 6, 2006

Related U.S. Application Data

(63) Continuation of application No. PCT/FR2004/050178, filed on Apr. 30, 2004.

(30) Foreign Application Priority Data

May 2, 2003 (FR) .................................. 03 50139

(51) Int. Cl.
*H04L 12/56* (2006.01)
*H04N 7/167* (2006.01)

(52) U.S. Cl. ......................... 370/389; 360/60; 380/201; 386/94

(58) Field of Classification Search ....................... None
See application file for complete search history.

(56) References Cited

U.S. PATENT DOCUMENTS 5,982,891 A 11/1999 Ginter et al.
6,091,769 A * 7/2000 Moon ......................... 375/240
6,570,926 B1 * 5/2003 Agrawal et al. ........ 375/240.27

(Continued)

FOREIGN PATENT DOCUMENTS

EP 0 837 609 A2 4/1998

(Continued)

OTHER PUBLICATIONS

PCT International Search Report for PCT/FR2004/050178 (attached to PCT publication No. WO 2004/100532), published Oct. 18, 2004.

(Continued)

*Primary Examiner*—Hong Cho
*Assistant Examiner*—Robert C Scheibel
(74) *Attorney, Agent, or Firm*—Connolly Bove Lodge & Hutz LLP

(57) ABSTRACT

A process for secure distribution of original digital audiovisual streams including audio, video components or other data, including packetizing the original stream into packets that can be manipulated and have a flexible size, wherein each packet includes a header containing information about the packet and a useful load including part of the data of the stream, analyzing the packetized stream prior to transmission to client equipment to generate a main stream in conformity with a packetized format of the original stream, modified in that all or part of the packets were substituted by packets of the same structure, but whose content was modified, and generating complementary information with any format suitable to permit reconstruction of the original stream, and separately transmitting the modified main stream and complementary information generated from the server to addressed equipment.

24 Claims, 1 Drawing Sheet

1 2 3 4 31 71 51 52 5 6 7 14 9 8 10 61 17 11 16 12 20 13 18 15

U.S. PATENT DOCUMENTS

| | | | | |
|---|---|---|---|---|
| 6,886,040 | B1 * | 4/2005 | Fitzgerald | 709/224 |
| 7,298,741 | B2 * | 11/2007 | Hung | 370/389 |
| 7,382,969 | B2 * | 6/2008 | Dawson | 386/94 |
| 2004/0168185 | A1 * | 8/2004 | Dawson et al. | 725/38 |
| 2006/0075135 | A1 * | 4/2006 | Rambhia | 709/238 |

FOREIGN PATENT DOCUMENTS

| | | | |
|---|---|---|---|
| EP | 0 969 666 | A2 | 1/2000 |
| FR | 2812147 | A | 1/2002 |
| FR | 2845554 | A | 4/2004 |
| WO | WO 00/60846 | A2 | 10/2000 |
| WO | WO 01/97520 | A2 | 12/2001 |

OTHER PUBLICATIONS

PCT International Preliminary Report on Patentability for PCT/FR2004/050178, Nov. 4, 2005.

* cited by examiner

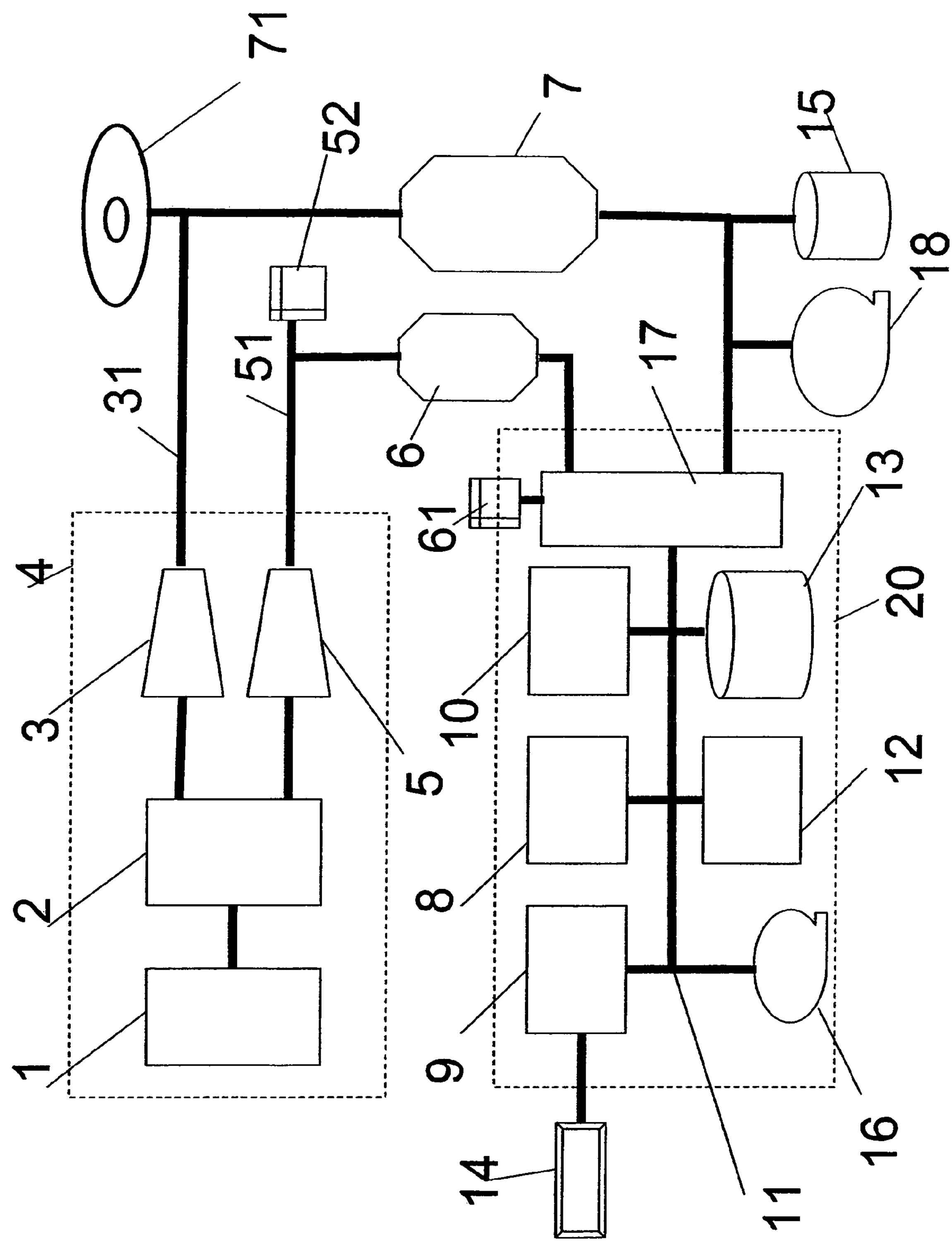
71
7
52
15
18
31
51
17
6
13
61
4
20
3
10
12
5
2
8
1
9
16
14
11

PROCESS AND DEVICE FOR SECURING THE TRANSMISSION, RECORDING AND VIEWING OF DIGITAL, AUDIOVISUAL PACKETIZED STREAMS

RELATED APPLICATION

This is a continuation of International Application No. PCT/FR2004/050178, with an international filing date of Apr. 301 2004 (WO 2004/100532, published Nov. 18, 2004), which is based on French Patent Application No. 03/50139, filed May 2, 2003.

FIELD OF THE INVENTION

This invention relates to processing digital audiovisual streams, more particularly to a process and system for permitting recomposition of digital audiovisual content that had been previously visually modified.

BACKGROUND

It is possible to transmit films and audiovisual programs in digital form via broadcasting networks of the microwave, herzian, cable, satellite type, etc. or via telecommunication networks of the DSL (digital subscriber line) type or BLR (local radio loop) type or via DAB (digital audio broadcasting) networks, etc. Moreover, to avoid pirating of works broadcast in this manner, the latter are frequently encrypted or scrambled by various well known means.

WO 00/60846 discloses distribution of video on demand via a system of distributed servers. Protection of the digital video content is based on a system of encryption based on digital keys. That permits an encryption and decryption of streams in conformity with the MPEG-TS (MPET transport stream) norm, simplified in that an analysis of the MPEG stream is made in advance to optimize the encryption as a function of the structure of the stream. In fact, the calculation time is greatly reduced by virtue of a selective and optimum encryption of the MPEG-TS stream. Analysis of the stream consists principally of marking the TS packets containing information essential for a correct decoding of the video in the MPEG sense in such a manner that in a second encryption phase only the useful data of the marked TS packets is encrypted. Thus, the essential information is not available for a non-authorized decoding and the stream can therefore not be displayed while preserving a reasonable calculation time for the encryption. However, that solution does not allow a resolution of the security problem because the protection of the video stream is based on an encryption system based on digital keys but for which the video stream transmitted to receiving equipment contains in encrypted form all the information initially present in the original video stream. Thus, the video stream received by the client equipment already contains information initially present in the non-encrypted video stream even if they are stored in a form that does not permit their immediate use. An ill-intentioned user, even if disconnected from the network, can process the encrypted video stream in such a manner as to return it to a form that can be used by a classic video decoder and can thus circumvent the protection system.

SUMMARY OF THE INVENTION

The invention relates to a process for secure distribution of original digital audiovisual streams including audio, video components or other data, including packetizing the original stream into packets that can be manipulated and have a flexible size, wherein each packet includes a header containing information about the packet and a useful load including part of the data of the stream, analyzing the packetized stream prior to transmission to client equipment to generate a main stream in conformity with a packetized format of the original stream, modified in that all or part of the packets were substituted by packets of the same structure, but whose content was modified, and generating complementary information with any format suitable to permit reconstruction of the original stream, and separately transmitting the modified main stream and complementary information generated from the server to addressed equipment.

The invention also relates to apparatus for production of an audiovisual stream according to the process, including at least one multimedia server containing original audiovisual sequences and a device that analyzes the audiovisual stream from the server to generate the modified main stream and the complementary information.

The invention further relates to apparatus for exploitation of an audiovisual stream according to the process, including a standard reader of packetized streams, at least one recording interface that stores the contents of the modified main stream, at least one decoder element that processes the packetized format and at least one interface that displays and listens, and means for recomposition of the original stream from the modified main stream and the complementary information.

The invention still further relates to a system for the transmission of an audiovisual stream including apparatus including at least one multimedia server containing original audiovisual sequences and a device that analyzes the audiovisual stream from the server to generate the modified main stream and the complementary information, at least one piece of equipment for exploiting an audiovisual stream including a standard reader of packetized streams, at least one recording interface that stores the contents of the modified main stream, at least one decoder element that processes the packetized format and at least one interface that displays and listens, and means for recomposition of the original stream from the modified main stream and the complementary information, and at least one communication network between the production equipment and the piece(s) of exploitation equipment.

BRIEF DESCRIPTION OF THE DRAWING

The drawing is a schematic diagram showing selected aspects of a system in accordance with aspects of the invention.

DETAILED DESCRIPTION

One aspect of this invention relates to a process for securing an audiovisual stream. It authorizes video services on demand and a la carte via broadcasting networks and the local recording in the memory of the digital decoder box of the user, as well as the direct or off-line viewing of television channels. It preserves, outside the user's dwelling, and in fact in the broadcasting and transmitting network, a part of the audiovisual program recorded at the user's or directly broadcasted, which part is of primary importance for viewing the audiovisual program on a television screen or monitor type screen, but which has a very small volume relative to the total volume of the digital audiovisual program recorded at the user's or received in real time. The missing part is transmitted in real time via the broadcasting (transmitting) network at the moment of viewing the audiovisual program.

The larger part of the audiovisual stream, called "modified main stream," is therefore transmitted via a classic broadcasting network, whereas the remaining part, called "complementary information" will be sent on demand via a narrowband telecommunication network such as the classic telephone networks or cellular networks of the GSM, GPRS or BLR types, or also by using a subset of the bandwidth shared on a cable network. The audiovisual stream is reconstituted in the addressed equipment (decoder) by a synthesis module from the modified main stream and the complementary information.

Currently, the majority of security systems operate either on elementary streams, elementary audio/video, (ES: elementary stream) or directly on transport streams (TS: transport stream). Integration of the protection systems into channel decoders (satellite or terrestrial), commonly called "set-top-boxes," poses certain problems associated with the very architecture of these decoders and of the manner with which they process data. In fact, many channel decoders use an intermediate format called PES "packetized elementary stream" for processing and viewing the data.

This invention provides a protection system comprising an analysis and scrambling module based on the PES format and comprises an analysis and descrambling module and can consequently be readily integrated into decoders of existing digital audiovisual streams.

In a general aspect, the invention concerns a process for secure distribution of original digital audiovisual streams constituted of audio, video components or other data, wherein the original stream is a stream packetized into logical entities called "packets" that can be manipulated and have a flexible/modular/definable size. Each packet comprises a header containing information about the packet and a useful load comprising part of the data of the stream, and an analysis of the packetized stream is made prior to transmission to client equipment for generating a main stream in conformity with the packetized format of the original stream, modified in that all or part of the packets are substituted by packets of the same structure, but whose content was modified, and for generating complementary information with a format suitable to permit reconstruction of the original stream, then for separately transmitting the modified main stream and the complementary information generated from the server to the addressed equipment.

The process can include the following characteristics:

The substituted packets contain information relative to one or several audio or visual streams included in the packetized stream, Analysis of the stream comprises a stage for selecting the packets to be substituted, Each packet incorporates all or part of one (or several) access unit(s), The complementary information contains substituted packets stemming from the original nominal stream, The complementary information contains packets representing these access units, The complementary information comprises synchronization data containing temporal references and metadata associated with the modified or substituted packets, The complementary information comprises instructions describing the actions to be performed on the packets following the processed packet, The packets used for substituting the packets of the original stream are selected in such a manner that the modified mainstream has the same size in bytes as the original stream, A synthesis is calculated on the addressed equipment of a stream with the nominal format as a function of the modified main stream and of the complementary information, The original stream to be protected is encoded according to a proprietary norm or standard supporting the packetized format such as, e.g., the PES formats of the MPEG-2 or MPEG-4 norms.

The invention also relates to a device capable of securely transmitting a set of video streams with a high visual quality to a viewing screen of the television screen type and/or for being recorded on a hard disk or on any other recording support of a box connecting the telecommunication network to a viewing screen such as a television screen, a projector or a personal computer monitor while preserving the audiovisual quality, but avoiding fraudulent use such as the possibility of making pirated copies of films or audiovisual programs recorded on the hard disk or other recording support of the decoder box.

The invention concerns a client-server system and the mechanism for synchronization between the server supplying the secure digital stream that allows viewing the audiovisual content and between a client who reads and displays the digital audiovisual stream.

Another aspect of the invention concerns equipment for producing an audiovisual stream comprising at least one multimedia server containing the original audiovisual sequences and a device for analyzing the audiovisual stream coming from the server to generate a modified main stream and complementary information.

The equipment may additionally comprise a standard reader of packetized streams, at least one recording interface (hard disk) for storing the content of the modified main stream, at least one decoder element that processes the packetized format and at least one interface for displaying and listening, comprising means for recomposition of the original stream from the modified main stream and from the complementary information.

A system for transmission of an audiovisual stream may also comprise equipment for production of an audiovisual stream and at least one piece of equipment for exploiting an audiovisual stream and at least one communication network between the production equipment and the piece(s) of exploitation equipment.

Selected aspects of the invention will be better understood from a reading of the following description of a non-limiting exemplary embodiment that refers to the FIGURE, that describes one selected architecture of a system for implementing the process. Working out the protection of the video and audio streams is based on the packetized structure of the audiovisual streams and the characteristics stemming from the packetization, whose properties are presented below with the aid of an example describing the PES format.

A PES (packetized elementary stream) packetized elementary video stream is a digitally coded infinite succession of images (frames, planes) that can be of the intra type (I reference image), predicted (P images) or bidirectional (B images), as described, e.g., in the MPEG formats. Likewise, a packetized elementary audio stream is a succession of audio frames or blocks. These coded video or audio frames are of different sizes and constitute what is called "access units."

Before being transformed into a PS (program stream) or a TS (transport stream), an ES (elementary stream) undergoes an intermediate packetization stage that allows it to be cut into packets that are useful and can be readily manipulated called "PES packets." The resulting stream is called a "packetized elementary stream" (PES).

A PES packet of a packetized elementary stream is a logical structure comprising a header and a useful load. The useful load simply represents data taken directly from the access units of the elementary stream to be packetized. It is not obligatory that the beginning of the useful load coincides with the beginning of an access unit and, consequently, an access unit can appear anywhere in the PES packet and it is even possible that several access units are contained in one in the same packet.

The header of a PES packet can have a variable length and mainly comprises a prefix for the packet beginning that, as its name indicates, permits a synchronization to be made with the beginning of a PES packet. This prefix is followed by a stream identifier that allows packets belonging to one of the different elementary streams in one and the same program to be distinguished. The header can also contain time stamps, that are of two types. The presentation time stamp (PTS) that specifies the hour at which an access unit is to be displayed and, as for the decoding time stamp (DTS), it specifies the hour at which an access unit is to be moved from the storage buffer to the decoder for being processed. In the case of audio PES packets, only the PTS time stamp is present and the audio frames are decoded sequentially. These two temporal prints/patterns are of great importance and permit, among other things, a PES packet to be distinguished in a unique manner in the stream.

The size of a PES packet can be variable and the characteristic confers great flexibility to the stream because the length of the PES packets can be modeled as a function of the intended application.

The analysis and scrambling system is based on the substitution and modification of PES packets. In fact, as each PES packet contains part of an access unit or several access units, it is easy to remove a certain number of essential packets of the original stream and substitute them by replacement packets that serve as decoys. The replacement packets have a format that is the same as the substituted packets. Before proceeding to a substitution of the packets, they are identified in a unique manner, which permits them to be readily reconstituted. For example, the audio/video MPEG-2 norm specifies a certain number of elements in its system part (ISO/CEI 13818-1) that permit the identification.

Thus, each PES packet to be substituted is identified in a unique manner by a couple composed by a stream identifier and either the presentation time stamp (PTS) in the case in which the access unit that includes the PES packet is of the I or P type, or the decoding time stamp (DTS) in the case in which the access unit including the PES packet is of type B. For packets of the audio type, the same principle is applied in such a manner that each audio packet in the PES format is identified by the identifier of the stream to which it belongs and by the presentation time stamp (PTS) of the audio access unit associated with it. Concretely speaking, the scrambling system receives an elementary stream (ES) or a transport stream (TS) at its input, transforms it into PES format and, after analysis of the content of the PES packets, produces two different streams, a modified main stream containing the original stream in which a certain number of PES packets were substituted by "decoy" packets, and complementary information containing the packets with the original values, and optionally the information necessary for the localization of these packets in the PES stream and/or instructions for carrying out modifications in the packets following the modified packet.

The packets to be substituted are judiciously selected to guarantee a reasonable throughput/transmission rate of the complementary information. Thus, for example, a compromise may be made between the degree of visual scrambling and the volume or the throughput of complementary information at the output of the analysis and scrambling module. The original stream is reconstituted in the decoder box of the addressed equipment in which the analysis/descrambling module is integrated that reconstitutes a stream that is the same as the original PES stream as a function of the modified main stream and the complementary information sent in real time. The process is lossless.

Selected aspects of the invention will be better understood from an exemplary embodiment concerning a stream in the MPEG-2 format. In this example, the integration of a descrambling module in a commercial channel (satellite or terrestrial) decoder is displayed. The analysis/descrambling system is the counterpart of the analysis and scrambling system previously described because it performs the inverse operation of the latter. It shows to what extent selection of the packetized elementary stream is adapted to the processing in material platforms. In this preferred but non-limiting example element 1 is the video stream to be scrambled, module 2 is the analysis and scrambling module that receives at its input an audiovisual stream in MPEG-2 TS or MPEG-2 ES, transforms the input stream in an MPEG-2 stream to the PES format and generates two different parts at its output: The modified main stream, reconverted in format TS 31 after the substitution of certain PES packets, and the complementary information 51 of any format. Modified main stream 31 is stored in buffer 3 of server 4 and is then sent in real time to the user via high-throughput network 7 that can be, e.g., of the ADSL, cable or satellite type. Complementary information 51 is stored in buffer 5 and then sent to addressed equipment 20 via low-throughput transmission means 6 such as a classic telephone line or mobile GSM, GPRS, UMTS network or even a local wire or wireless loop network. Networks 6, 7 can be combined in a single network, e.g., complementary information 51 is also sent via broadband network 7.

Element 20 represents a decoder box for a satellite channel, for example. Modified main stream 31 in MPEG-2 TS format arrives directly on input interface 17 and transits via bus 11 to demultiplexor 12. Demultiplexor 12 generates a packetized elementary stream (PES) and sends it on data bus 11 to be processed and/or stored.

In another embodiment, the main stream modified at the input of demultiplexor 12 comes from hard disk 13 of the decoder box. Modified main stream 31 arriving at input interface 17 may come from external hard disk 15 such as, e.g., the hard disk of a PC connected to decoder box 20. In another embodiment, the main stream modified at the input of interface 17 may come from a physical support (CD, DVD or other storage element) 17 etched at the output of server 4 with the information of modified main stream 31 and transmitted to external reader 18. Physical support 71 is advantageously read by reader 16 integrated in box 20.

In another embodiment, the modified main stream may first be processed by demultiplexor 12 then stored in PES format on hard disk 13 of the decoder box. The modified main stream is advantageously stored beforehand in TS format either on a hard disk (that of decoder box 13 or an external hard disk 15), or on a physical support (CD, DVD) before being demultiplexed.

To perform descrambling, the modified main stream in PES format is sent to temporary storage memory 10 via transport bus 11. Complementary information 51 is then transmitted on request to decoder box 20 via network 6 and after having transited through input interface 17 and data bus 11, it is stored in part in temporary storage memory 10.

Synthesis and descrambling device 8 recovers the parts of modified main stream 31 and complementary information 51 stored in temporary storage module 10 and performs descrambling of the modified main stream in real time. Complementary information 51 arrives in real time via network 6, input interface 17 and bus 11 to the extent that synthesis device 8 requires it. However, the totality of complementary information 51 is never sent completely to the user. Once the stream has been descrambled, synthesis device 8 sends it to reader 9 that decodes it and then sends it to viewing and listening module 14 of the television screen type.

Another embodiment will now be described detailing various stages for a user 20.

Portal 4 has selected the MPEG-2 TS stream 31 that it is to send to decoder box 20 of the user for being viewed on his TV screen 14. The user is connected to digital broadcasting network 7 and ADSL communication network 6.

Analysis and scrambling module 2 of portal 4, therefore, reads input stream MPEG-2 TS 1 or MPEG-2 ES 1, transforms it into an MPEG-2 PES stream, analyzes the content of the PES packets and each time that it detects a PES packet to be modified its substitutes it with a "decoy" PS packet that has the same size as the substituted video and audio packet. In distinction to the audio, whose frames are selected with a constant length for the video, this analysis permits it to recognize the access units in the bitstream to be modified as a function of what they contain: Frames I, P or B. Selection of the PES packets to be modified is made as a function of the bandwidth available for complementary information 51. If connection 6 has a low throughput, PES packets containing access units comprising B or P images are substituted, and if connection 6 has a greater throughput, certain access units containing I images are substituted as well. The content of the PES packets is substituted by random values without changing their size within the PES packet to render the frames (and consequently the sequence) non-acceptable from the standpoint of human visual and auditory perception, but in conformity with the standard of the format of the input stream 1. The true PES packets are stored in output buffer 5, that permits a subsequent reconstitution of the start sequence in box 20 following the inverse scheme.

Analysis and scrambling module 2 then records each true PES packet in buffer 5 and continues its analysis until the end of the MPEG-2 input stream to select the following PES packets to be modified. According to another aspect of this example, analysis and scrambling module 2 additionally records in the buffer containing complementary information 51 information permitting the modified packet to be localized in the PES stream.

According to another aspect, analysis and scrambling module 2 additionally records in the buffer containing complementary information 51 instructions and data describing modifications to be made to the PES packets that follow the substituted packet.

The modified new MPEG-2 stream is then converted to MPEG-2 TS format to be broadcast on the broadcasting network via connection 7 and recorded in output buffer 3. The substituted PES packets of input MPEG-2 stream 1 are memorized in buffer 5 of portal 4. The modified new MPEG-2 stream is advantageously converted to the MPEG-2 TS format to be recorded on a disk 71 like a CD or DVD. The CD or DVD 71 created may be read at the moment of viewing the stream by decoder 20 via internal reader 16 or via external reader 18.

At the same time or later and, e.g., in a totally non-synchronized manner the modified MPEG-2 TS output stream coming from output buffer 3 of portal 4 is broadcast via broadband network 7 to input interface 17 of user 20 and stored, after demultiplexing, on hard disk 13 of the decoder box in PES format. The protected MPEG-2 stream is advantageously broadcast to a set of users 20.

The phase described above corresponds to a first preparation phase of the MPEG-2 by portal 4, to its transmission via broadband network 7 and to its recording in decoder 20. This decoder can then display, after processing, the MPEG-2 PES stream recorded on its hard disk 13. To this end, synthesis system 8 of decoder 20 reads the MPEG-2 PES file from its hard disk 13 and sends it to a classic MPEG-2 reader 9. If no complementary information is received by synthesis system 8, then the MPEG-2 PES stream arriving at reader 9 is treated, displayed and heard as it is, which produces a significant distortion of its sound and of its display on television set 14. In fact, the modified PES packets treated by synthesis module 8 do not correspond to the PES packets necessary for a correct viewing and listening since some of the PES packets were substituted by packets with random values. On the other hand, as the recorded stream is a stream of the MPEG-2 PES type, reader 9 makes no distinction and restores the information on output screen 14 that does appear like data of an audio/video MPEG-2 PES stream, but is totally incoherent for the eye and ear of a human looking at television screen 14 and hearing the sound. Every copy of the MPEG-2 TS stream coming from hard disk 13 of box 20 may produce the same audiovisual effect during its restoration by a MPEG reader. When the user of decoder 20 wants to view the auto visual program recorded on hard disk 13 on screen 14, the user requests this from synthesis system 8 with a remote control as with a video cassette recorder or a DVD reader showing a menu on the TV screen. Synthesis module 8 then makes a request to hard disk 13 and the data read is temporarily stored in input buffer 10. Synthesis module 8 then establishes a connection with portal 4 via telecommunication network 6 that is in the example of an ADSL connection. Once this connection has been established, and during the entire duration of the viewing of the audiovisual film or program, synthesis module 8 retrieves the original PES packets from buffer memory 5 of server 4 via buffer 10 in which the demultiplexed PES function is temporarily recorded. The data comes to synthesis module 8 via the internal bus to decoder 11. Synthesis module 8 identifies the packets to be modified using the localization data contained in complementary information 51.

The PES packets may be read and their localization in the stream obtained by reading their header.

Also, the complementary information may contain, in addition to the original PES packets, instructions about the actions to be performed on the packets to follow, e.g., inversion of certain well-selected bits in part of the following packets. Starting from the modified MPEG-2 PES stream that also comes from buffer 10 and the original PES packets coming via connection 6, synthesis module 8 reconstitutes the original MPEG-2 PES stream inversely to the process of analysis and scrambling previously described and sends the reconstituted MPEG-2 PES stream to reader 9 for display on screen 14 and correctly played.

During their use, the original PES packets coming from portal 4 and constituting the complementary information 5 are advantageously deleted from synthesis system 8.

Before portal 4 sends the original PES packets and associated data from its buffer 5, portal 4 has advantageously verified that the user of the box 20 is properly authorized to receive the complementary information.

Modified main stream 5 is advantageously passed directly via network 7 to input interface 17 and then transited via bus 11 to memory buffer 10 and synthesis module 8.

Modified main stream 31 is advantageously inscribed (recorded) on a physical support such as a disk of the CD-ROM or DVD type, hard disk, flash memory card 71. Modified main stream 31 is then read from physical support 71 by disk reader 16 of box 20 or by external disk reader 18 to be transmitted to reading buffer memory 10 then to synthesis module 8.

Complementary information 51 is advantageously recorded on a physical support 52 with a credit card format comprising a smart card or a flash memory card. Card 52 will be read by module 17 of device 20, that comprises card reader 61 Card 52 advantageously contains the applications and algorithms that will be executed by synthesis module 20.

Device 20 is advantageously an autonomous, portable and mobile system.

The exemplary embodiment applies to audiovisual streams stemming from the MPEG-2 norm and likewise to normalized or standardized digital formats such as MPEG-1, MPEG-4, H262, H264 as well as to the digital formats that generate packets of private data, that is, that the securing process applies to all digital formats, for example, but not solely limited to those governed by the "systems" part of the MPEG-2 (ISO/CEI 13818-1) norm.

The invention claimed is:

1. A process for secure distribution of original digital audiovisual streams including audio, video components or other data, comprising:

packetizing an original audiovisual stream into packets that can be manipulated and have a flexible size, wherein the packets include respective headers containing information about the respective packets and contain respective load information, analyzing the packetized stream prior to transmission to client equipment to generate a main stream in conformity with a packetized format of the original audiovisual stream, modified in that all or part of the packets of the main stream correspond to substitute packets of the same structure as respective packets, but having modified content with respect to the respective packets, and generating complementary information with any format suitable to permit reconstruction of the original stream, wherein the complementary information includes instructions describing actions to be performed on the packets of the main stream, and separately transmitting the main stream and complementary information generated from the server to the client equipment to securely distribute the original audiovisual stream.

2. The process according to claim 1, wherein the packets for which substitute packets were provided contain information relative to one or several audio or visual streams included in the packetized stream.

3. The process according to claim 1, wherein analyzing the packetized stream comprises selecting the packets of the packetized stream for which substitute packets are to be substituted.

4. The process according to claim 1, wherein at least one of the packets incorporates all or part of one or more access units.

5. The process according to claim 1, wherein the complementary information contains packets stemming from the original audiovisual stream for which substitute packets were substituted.

6. The process according to claim 4, wherein the complementary information contains at least one packet representing the access units.

7. The process according to claim 1, wherein the complementary information further includes synchronization data containing temporal references and metadata associated with the packets for which substitute packets were substituted.

8. The process according to claim 1, wherein the instructions describe actions to be performed on the packets following a processed packet.

9. The process according to claim 1, wherein analyzing the packetized stream comprises selecting the packets for which substitute packets are to be substituted such that the main stream has the same size in bytes as the original audiovisual stream.

10. The process according to claim 1, wherein transmitting the main stream and complementary information enables the client equipment to synthesize a stream with a nominal format as a function of the main stream and the complementary information.

11. The process according to claim 1, wherein the original audiovisual stream is encoded according to a proprietary norm supporting a packetized format.

12. Apparatus configured to operate according to the process of claim 1, the apparatus comprising at least one multimedia server configured to contain original audiovisual sequences and a device configured to analyze an audiovisual stream from the at least one multimedia server and to generate the modified main stream and complementary information.

13. Apparatus configured to exploit the main stream and complementary information produced according to the process of claim 1, comprising a standard reader of packetized streams, at least one recording interface configured to store content of the main stream, at least one decoder element configured to process a packetized format, at least one interface configured to display and listen, and means for recomposition of the original audiovisual stream from the main stream and the complementary information.

14. A system for securely transmitting an audiovisual stream, comprising apparatus including:

at least one multimedia server configured to contain original audiovisual sequences and a device configured to analyze an audiovisual stream including one or more audiovisual sequences from the at least one multimedia server and to generate a main stream and complementary information, wherein the complementary information includes instructions describing actions to be performed on packets of the main stream, and at least one piece of equipment configured to exploit the main stream and complementary information, the equipment including a standard reader of packetized streams, at least one recording interface configured to store the contents of the main stream, at least one decoder element configured to process a packetized format, at least one interface configured to present output, and means for recomposition of the audiovisual stream from the main stream and the complementary information, wherein the complementary information is received separately from the main stream to maintain secure distribution of the audiovisual stream to the at least one piece of equipment.

15. The apparatus according to claim 12, wherein the instructions describe actions to be performed on the packets following a processed packet.

16. The apparatus according to claim 13, wherein the instructions describe actions to be performed on the packets following a processed packet.

17. The apparatus according to claim 14, wherein the instructions describe actions to be performed on the packets following a processed packet.

18. The apparatus according to claim 12, wherein the audiovisual stream is encoded according to a proprietary norm supporting the packetized format.

19. The apparatus according to claim 13, wherein the original audiovisual stream is encoded according to a proprietary norm supporting the packetized format.

20. The system according to claim 14, wherein the audiovisual stream is encoded according to a proprietary norm supporting the packetized format.

21. The system according to claim 14, wherein the device configured to analyze is further configured to separately transmit to the at least one piece of equipment the main stream and the complementary information, to enable secure distribution of the audiovisual stream to the at least one piece of equipment.

22. The process of claim 1, wherein at least one substitute packet includes a random value substituted for a value found in the packet for which the substitute packet is substituted.

23. The system according to claim 14, wherein the device configured to analyze is configured to generate at least one packet of the main stream by substituting a modified packet for an original packet.

24. The system according to claim 14, wherein at least one modified packet is modified by substituting a random value for at least one value contained in the respective original packet.

* * * * *

UNITED STATES PATENT AND TRADEMARK OFFICE

CERTIFICATE OF CORRECTION

PATENT NO. : 7,613,181 B2
APPLICATION NO. : 11/264953
DATED : November 3, 2009
INVENTOR(S) : Lecomte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Nineteenth Day of October, 2010

David J. Kappos

*Director of the United States Patent and Trademark Office*